J. M. BURDICK.
Hay Spreader.
No. 84,087. Patented Nov. 17, 1868.
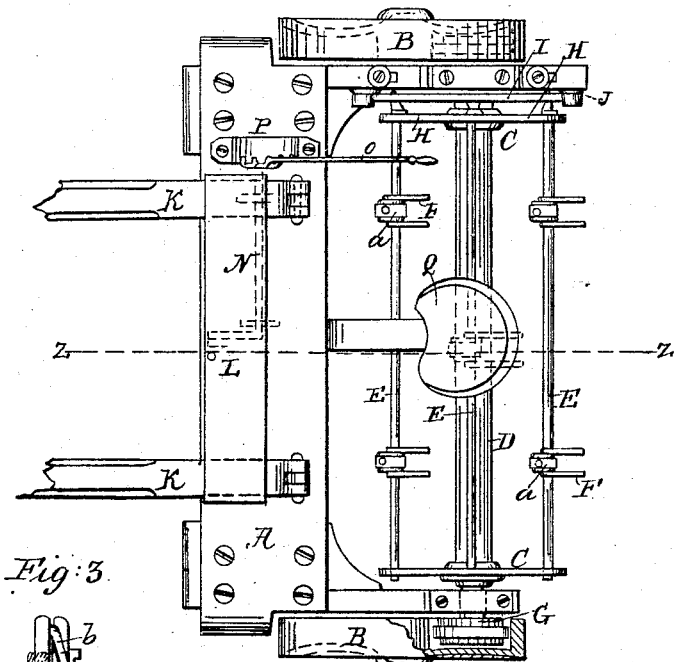
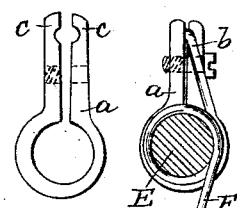
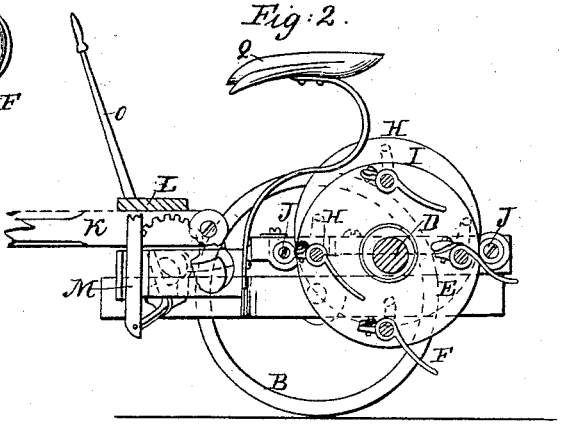

UNITED STATES PATENT OFFICE.

J. M. BURDICK, OF ILION, NEW YORK.

IMPROVEMENT IN HAY-SPREADERS.

Specification forming part of Letters Patent No. 84,087, dated November 17, 1868.

*To all whom it may concern:*

Be it known that I, J. M. BURDICK, of Ilion, Herkimer county, in the State of New York, have invented certain new and useful Improvements in Hay-Tedders; and I hereby declare the following to be a full and exact description thereof, reference being had to the accompanying drawings, forming part of this specification.

The nature or essence of my invention consists in connecting the bars holding and carrying the tedder-teeth to a revolving ring by means of cranks, said ring being confined between two rollers, and so arranged as to cause the teeth to point in about the same direction through their entire revolution with the tedder-frame, and in securing the teeth upon the tedder-bars by means of screw-clamps; also, in making the direction of the main frame of the machine, relatively to the shafts, adjustable, by means of a lever, link, and rock-shaft, so that the driver may be able to keep the points of the tedder-teeth at a proper elevation above the surface of the ground.

In the following more exact description of my improvements, I shall refer to the drawings before mentioned, of which Figure 1 is a plan of my improved tedder or hay-spreader; Fig. 2, a transverse sectional elevation at the line $z\ z$ on Fig. 1; and Figs. 3 and 4, views of the clamp for securing the teeth upon the bars, enlarged.

The main frame A is supported on the wheels B B, turning on pivots fastened to the frame, and the frame A itself supports the tedder-frame, consisting of the disks C C, the axis D, and the bars E E, holding the teeth F F.

The axis D, upon which the disks C C are fastened, turns in journals on the frame A, being driven by the friction at the contact of the wheels G G with the rims on the wheels B B, or by gears, or by bands on pulleys fastened upon the wheels B B, concentric with the pivots upon which these wheels turn.

The bars E E turn in the disks C C, and have fastened on their projecting ends cranks H H, of equal length, the pins of which project into the flat ring I.

As the position of each crank-pin in the ring I corresponds to the position of the bar with which it is connected in the disk C, and the ring I is confined between the rollers J J on the frame A, the revolution of the disk C, or of the tedder-frame, causes a simultaneous revolution of each bar in the disk relatively to the disk, and in an opposite direction to that in which the disk itself revolves, so that the teeth on the bars will constantly point in about the same direction, and this direction may be varied by varying the position of the rollers J J upon the frame A.

By this construction and arrangement the tedder-teeth may be made to take the grass at a proper angle of depression, and, maintaining the same direction as they rise, the grass will readily slip off and leave them clear.

The shafts K K are hinged upon the frame A, as shown, and the cross-bar L is connected by the link M to the rock-shaft N, operated by the hand-lever O, which is held by the rack P. By drawing the lever O back, or pushing it forward, the driver in the seat Q can depress or elevate the front of the frame A, and raise or lower the tedder-frame as required.

The teeth F are fastened upon the bars E by means of the screw-clamp $a$, a loop, $b$, formed of the connecting portion of two adjacent teeth, passing through an opening formed by the junction of the two scores $c\ c$ as they meet when the clamp is closed.

By changing the tedder-frame, end for end, and changing the direction of its motion by gears, cross-belt, or otherwise, my improved tedder may be readily converted into a hay-rake, or a stationary shaft, with other teeth, may be substituted for the tedder-frame, for the same purposes.

The wheels G (or pulleys) on the shaft D may be arranged to run loose on the shaft, and be held by a ratchet when the wheel is advancing, but turn free when the motion of the wheel is reversed, in order to make the machine turn more readily.

The foregoing being a description of my improved hay-tedder,

What I claim, and desire to secure by Letters Patent, is—

1. The combination and arrangement of the tedder-teeth F F, bars E E, with cranks H H, and revolving ring I, constructed and arranged to operate substantially as described.

2. In combination with the teeth F F, the loop $b$ and clamp $a$, for fastening said teeth upon the bars E E, substantially as described.

3. In combination with the tedding devices above claimed, hinging the shafts to the main frame A, and making their direction, relatively to said frame, adjustable, by means of the link M, rock-shaft N, and hand-lever O, to raise and lower the tedder-frame as required, substantially as described.

J. M. BURDICK.

Witnesses:
 HIRAM BURDICK,
 ROBERT BRYSON,
 W. H. THOMAS.